US010218277B2

(12) United States Patent
Carralero et al.

(10) Patent No.: US 10,218,277 B2
(45) Date of Patent: Feb. 26, 2019

(54) ADAPTABLE HIGH EFFICIENCY POWER INVERTER SYSTEM

(71) Applicant: THE BOEING COMPANY, Chicago, IL (US)

(72) Inventors: Michael A. Carralero, Huntington Beach, CA (US); Jimmy M. Quiambao, Walnut, CA (US); James L. Peck, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 182 days.

(21) Appl. No.: 15/050,054

(22) Filed: Feb. 22, 2016

(65) Prior Publication Data

US 2017/0244325 A1 Aug. 24, 2017

(51) Int. Cl.
*H02M 3/335* (2006.01)
*H02P 27/06* (2006.01)
*H02M 3/28* (2006.01)
*H02M 7/5387* (2007.01)
*H02M 1/00* (2006.01)

(52) U.S. Cl.
CPC ....... *H02M 3/33507* (2013.01); *H02M 3/285* (2013.01); *H02M 3/33546* (2013.01); *H02M 7/53871* (2013.01); *H02P 27/06* (2013.01); *H02M 2001/007* (2013.01); *H02M 2001/0077* (2013.01)

(58) Field of Classification Search
CPC ............. H02M 7/537; H02M 3/33584; H02M 3/33507; H02M 1/42; H02P 27/08; H02P 2201/03; H02P 27/06; H02P 6/085
See application file for complete search history.

(56) References Cited

U.S. PATENT DOCUMENTS 5,909,367 A * 6/1999 Change ................. H02M 5/271
363/163
6,414,455 B1 * 7/2002 Watson ................... F04B 47/02
318/432

(Continued)

OTHER PUBLICATIONS

Surin Khomfoi, Ph.D., Leon M. Tolbert, Ph.D., P.E.: Multilevel Power Converters; 2011; Power Electronics Handbook by Muhammed H. Rashid, Chapter 17, pp. 455-486.

*Primary Examiner* — Thai Dinh
(74) *Attorney, Agent, or Firm* — Coats & Bennett, PLLC

(57) ABSTRACT

Increased DC-to-AC power conversion efficiency in a scalable, flexible, resilient, cascading inverter driver topology. Plural power cells, which include a rectifier and an inverter, are arranged in a series/parallel topology. Use of plural power cells increases efficiency by reducing voltage transition losses and by increasing duty cycle. Also, the power cells output AC to an electric motor using a forward-looking controller that responds to varying power demand while maintaining motor speed at a maximum efficiency level. Power output is varied by varying the width of rectifier output pulses to the inverters while maintaining pulse voltage. Transitions between power levels are smoothed by pulse density modulation. Pulse density, determined automatically in the inverter, begins high and gradually becomes less dense so voltage changes rapidly then slowing gradually. The topology and power cell components allow faulty power cells 10 to be isolated and bypassed.

28 Claims, 14 Drawing Sheets

(56) References Cited

U.S. PATENT DOCUMENTS

| | | | |
|---|---|---|---|
| 6,538,404 B2* | 3/2003 | Kato | H02M 7/53871 318/139 |
| 7,782,643 B2* | 8/2010 | Hara | H02M 5/293 363/148 |
| 8,559,198 B2 | 10/2013 | Carralero et al. | |
| 8,766,474 B2 | 7/2014 | Carralero et al. | |
| 9,054,600 B2* | 6/2015 | Choi | H02M 7/48 |
| 9,159,487 B2 | 10/2015 | Peck | |
| 9,548,664 B2* | 1/2017 | Yabumoto | H03K 17/107 |
| 9,621,081 B2* | 4/2017 | Kawai | H02P 6/157 |
| 9,722,523 B2* | 8/2017 | Lee | H02P 21/36 |
| 2005/0286274 A1* | 12/2005 | Pfitzer | G01R 31/40 363/37 |
| 2006/0208574 A1 | 9/2006 | Lasseter et al. | |
| 2007/0129110 A1 | 6/2007 | Lasseter et al. | |
| 2008/0130182 A1* | 6/2008 | Anderson | H02M 7/493 361/78 |
| 2009/0032319 A1* | 2/2009 | Nagashima | B60L 11/1881 180/65.31 |
| 2011/0106325 A1* | 5/2011 | Opina, Jr. | H02J 3/386 700/287 |
| 2011/0298283 A1* | 12/2011 | Sannino | B63J 3/04 307/38 |
| 2012/0181871 A1* | 7/2012 | Johansen | H02J 9/062 307/66 |
| 2013/0063070 A1* | 3/2013 | Zhang | H02P 27/14 318/729 |
| 2014/0001993 A1* | 1/2014 | Iwata | H02P 27/04 318/400.26 |
| 2014/0042948 A1* | 2/2014 | Green | H02P 27/04 318/503 |
| 2014/0192570 A1* | 7/2014 | Nielsen | H02J 1/102 363/50 |

* cited by examiner

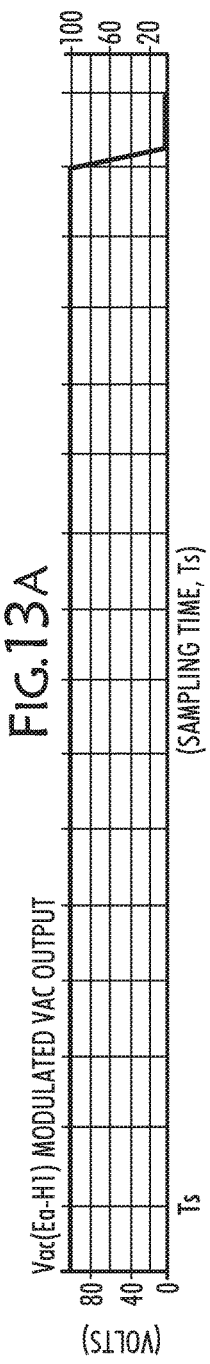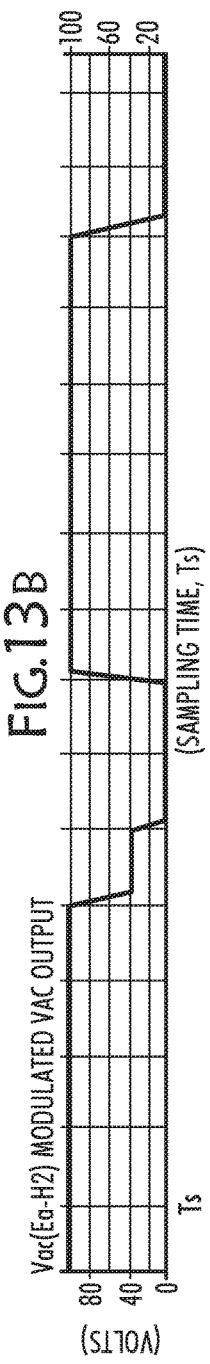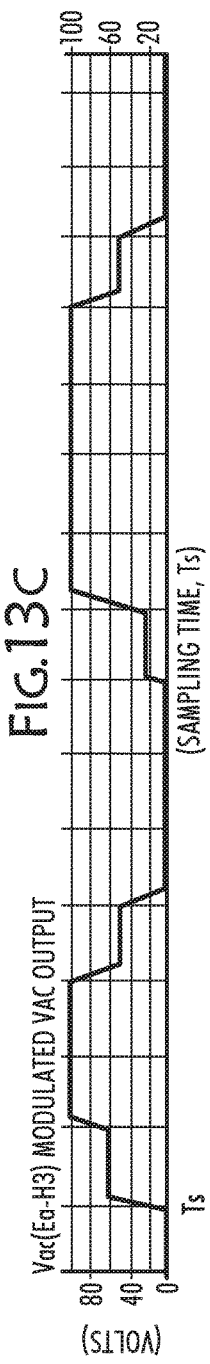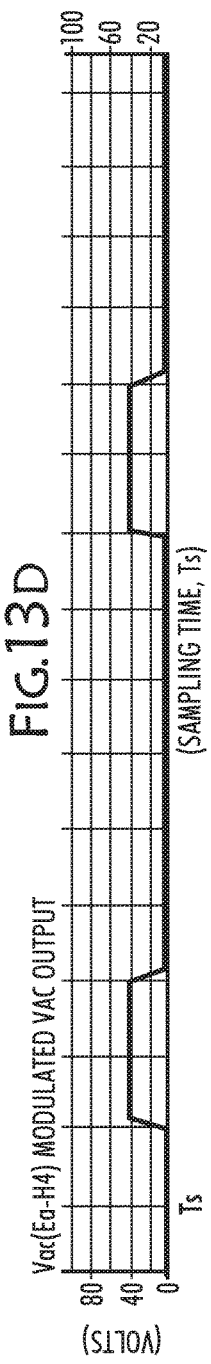

ADAPTABLE HIGH EFFICIENCY POWER INVERTER SYSTEM

TECHNOLOGICAL FIELD

The present disclosure relates generally to the delivery of electrical power to an electric power distribution grid from a variety of sources of electrical power. More particularly, the disclosure is directed to improving efficiency in connecting various sources of AC and DC electric power to meet a varying demand for an AC electrical power from an electrical power distribution grid.

BACKGROUND

Electrical power is transmitted via a power grid as alternating current from power generation facilities to industrial, commercial and residential customers. Generally, electrical power is generated by large electrical power generating stations. Recently, alternative sources of electrical power have been developed and connected to the power grid. Some of these sources, solar electric, for example, generate electrical power as direct current. In order for the electrical energy produced from these sources to be added to the grid, direct current is inverted, that is, changed from direct current to alternating current.

In addition, because the demand for electricity and some of the sources of electrical power, especially some of the newer sources, are variable, there is a need to match the demand to the source. Sources such as solar electric power, for example, generate electricity when the sun is shining, and wind power, when the wind is blowing. Similarly, electrical demand varies during the day, with the seasons, and evolves over time due to cyclical variations in the economy or structural usage growth such as increased use of electricity. Consequently, matching demand to capacity is a constant challenge. Inverting DC to AC is a growing part of that challenge.

Electric motors are used to produce torque to a shaft. The efficiency of an electric motor varies with load. Its efficiency, depending on the motor, will tend to peak as it approaches full load, at around 70%, and then decline slightly as it reaches full load; at loads lower than its peak, motor efficiency drops sharply. Motor efficiency is higher if its speed is constant.

It is known that inverting direct current using an inverter drive can be improved if smaller inverter drives are connected in electric series/parallel topologies. As demand grows, smaller inverters can be brought quickly on line one at a time, and all but the most recent one operated at full power. As demand falls, inverters are switched off one at a time so that, again, all of them but perhaps one of them are operated at full power. The overall efficiency of plural inverter drives is thus improved over one large drive, such as when demand is unsteady.

See U.S. Pat. No. 8,559,198, which discloses a high yield AC-AC power converter; U.S. Pat. No. 8,766,474, which discloses a smart micro-grid reconfigurable AC interface; and U.S. Pat. No. 9,159,487, which discloses a linear magnetic device, which are incorporated by reference herein in their entirety. See also chapter 17, p 455-p 486 of the Power Electronics Handbook by Muhammed H. Rashid, which is also incorporated herein by reference in its entirety, and which shows cascaded inverters with H-bridge rectifiers.

Because of the amount of electrical energy consumed worldwide and the interest in using alternative energy sources as part of the electric power grid, any improvement in energy production efficiency and reliability would yield important advantages.

SUMMARY

Improvements are disclosed in the efficiency of producing AC power using plural cascaded power cells in the transfer of electricity from electrical sources to an electrical grid. The improvement is in the control of these power cells by adjusting pulse width and pulse density modulation to track electrical demand more efficiently.

An aspect of the disclosure is tracking of peak power by varying the current and voltage to meet power demand of an electric motor while operating the motor at a steady speed.

Another aspect of the disclosure is building in flexibility in a power cell topology that allows isolating and bypassing failed power cells so that the balance of the system remains operational despite failures.

An aspect of the disclosure is an electric power inverter system that comprises a controller and power cells. A power cell includes a rectifier configured to rectify electricity and produce a direct current voltage as output. A power cell also includes an inverter that receives the direct current voltage from the rectifier and generates an alternating current voltage and an alternating current as its output. The controller enables the power cell to be in one of at least three states, including an ON state, wherein the power cell is maximized; an OFF state, wherein power cell produces zero power; and a high efficiency (HE) state, wherein the effective output of the power cell is held at a level between the ON state and said OFF state.

Another aspect of the disclosure is that the inverter of the electric power inverter system has a fourth state in addition to ON, OFF and HE, that is, a variable state, wherein the output of the power cell transitions between the outputs of the OFF state and the ON and HE states, and said controller controls the rate of transition.

An aspect of the disclosure is a method for transferring electricity from an electrical source to an electric motor by interconnecting plural power cells in a series/parallel topology. A power cell of the plural power cells has a rectifier that outputs a direct current voltage and an inverter that receives that direct current voltage from the rectifier and, in turn, outputs an alternating current voltage and alternating current. The rectifier is connected to a transformer in order to receive electricity from an electrical source. The inverter is connected to a motor and receives the alternating current voltage from the inverter. The power cell is activated when the motor demands electrical power. The power cell produces alternating current voltage and alternating current to meet the motor's demand for electric power. The rectifier outputs direct current voltage in pulses having a width and a height wherein the width of the pulses may vary as the height remains constant. The width of the pulses is adjusted as the demand on the motor varies to meet the demand and maintain the speed of the motor constant.

Another aspect of the power inverter system is an electric motor electrically connected to the power cell that receives the output of the inverter and uses it to run the motor at a steady speed, although the load on the motor may vary, using adjustments by the controller in the alternating current voltage and alternating current that are output by the inverter to control the speed of the motor. The speed at which the motor runs is selected to be the speed of the motor's peak efficiency.

Another aspect of the disclosure is that power cells are arranged in a topology responsive to signals from the controller and produce an output that meets the motor's demand efficiently. In particular, the controller causes the rectifier voltage output to be pulsed to the inverter so that the combination of the voltages of the pulses of voltage from the power cells generate the time-varying output AC voltage to meet varying demand.

Another aspect of the disclosure is the use of a topology that is a combination of a series-parallel arrangement of power cells. Individual power cells include components to facilitate control and fault resilience. For example, an input switch responsive to the controller can be used to shut off and isolate a power cell in the event that demand drops or the power cell fails. In addition, a power cell includes a temperature sensitive bypass switch so that, if the power cell overheats or it needs to be shorted, the power cell can be bypassed. A power cell also carries a fuse to protect against transients.

Another feature of the disclosure is a topology enables power cells to be placed in levels that operate electrically in series for summing voltages and in parallel to increase current.

A feature of the disclosure is use of pulse density by the controller to transition an increase in alternating current voltage in response to increased demand. Pulse density is related to the speed of the transition.

A feature of the disclosure is that a capacitor is placed between the rectifier and the inverter to hold the voltage.

Another feature of the disclosure is the monitoring of peak-to-peak output voltage controller, which provides feedback to the controller and thereby allow it to track changes in demand and to predict its direction using a forward-looking algorithm based the monitored variables.

A feature is the use of several clocks to perform the controller's function. Sampling of the monitored variables is done at one rate, monitoring is done at rate at least ten times faster, and the variable state has a pulse density that depends on the magnitude of the transition in voltage.

Another feature of the disclosure is that the controller controls the power cell by sending voltage signals to the inverter for opening and closing the inverter's four gated switches.

These and other features of the disclosure will be apparent to those skilled in power grid design and operation from a careful reading of the detailed description accompanied by the drawings.

BRIEF DESCRIPTION OF THE DRAWINGS

Figure 1:
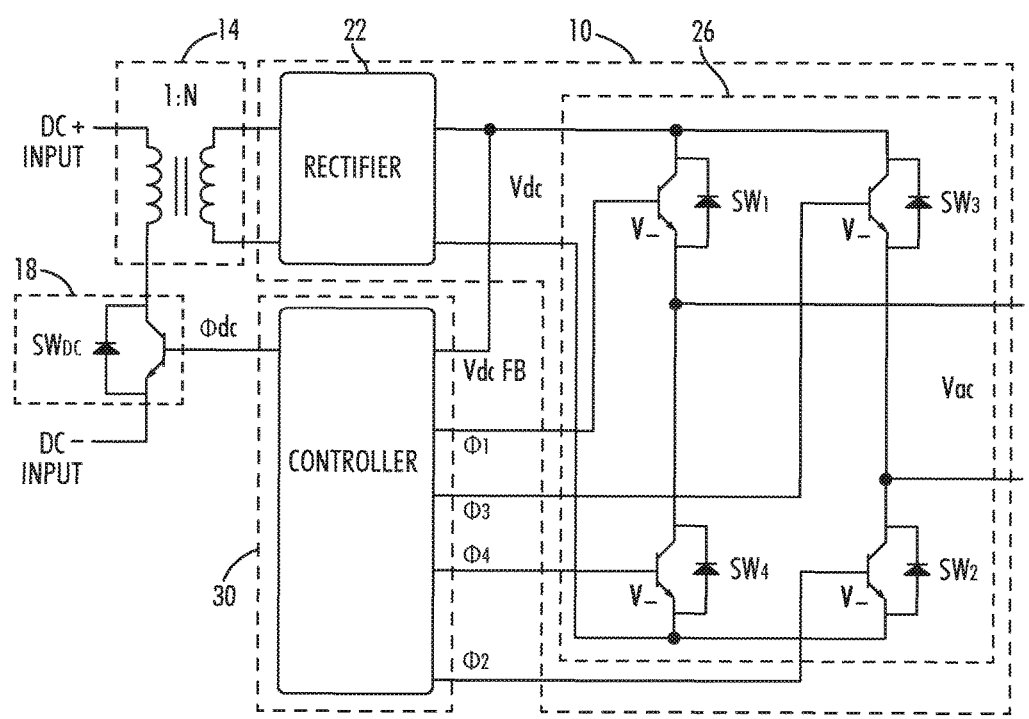
Figure 2:
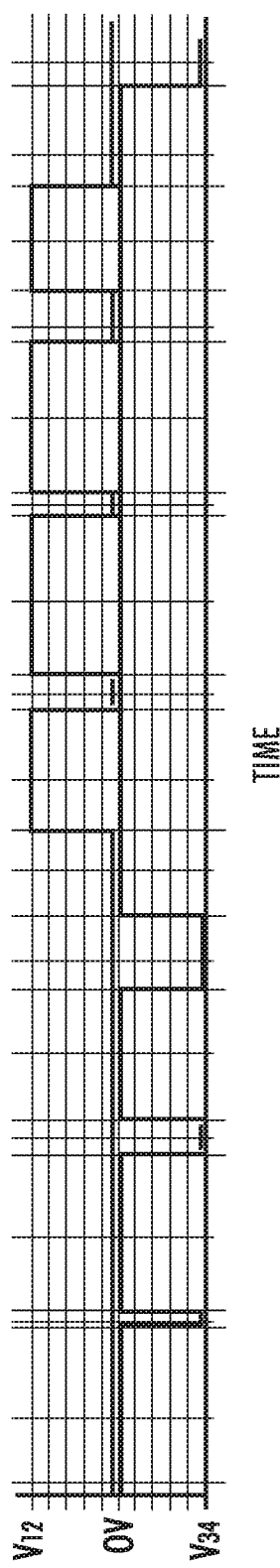
Figure 3:
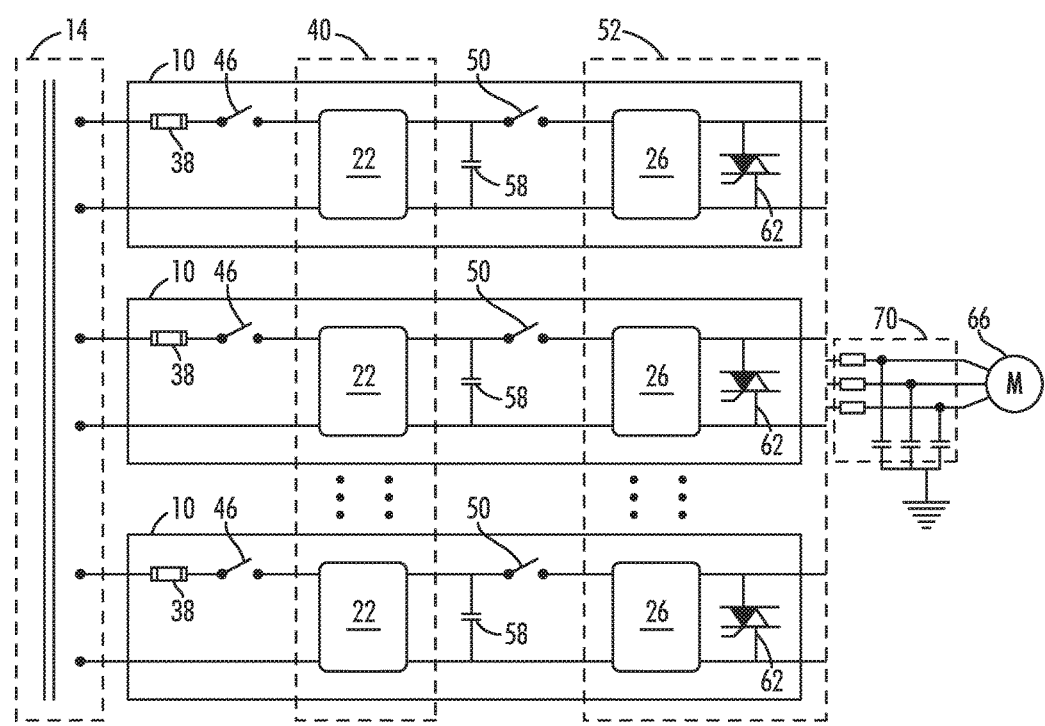
Figure 4A:
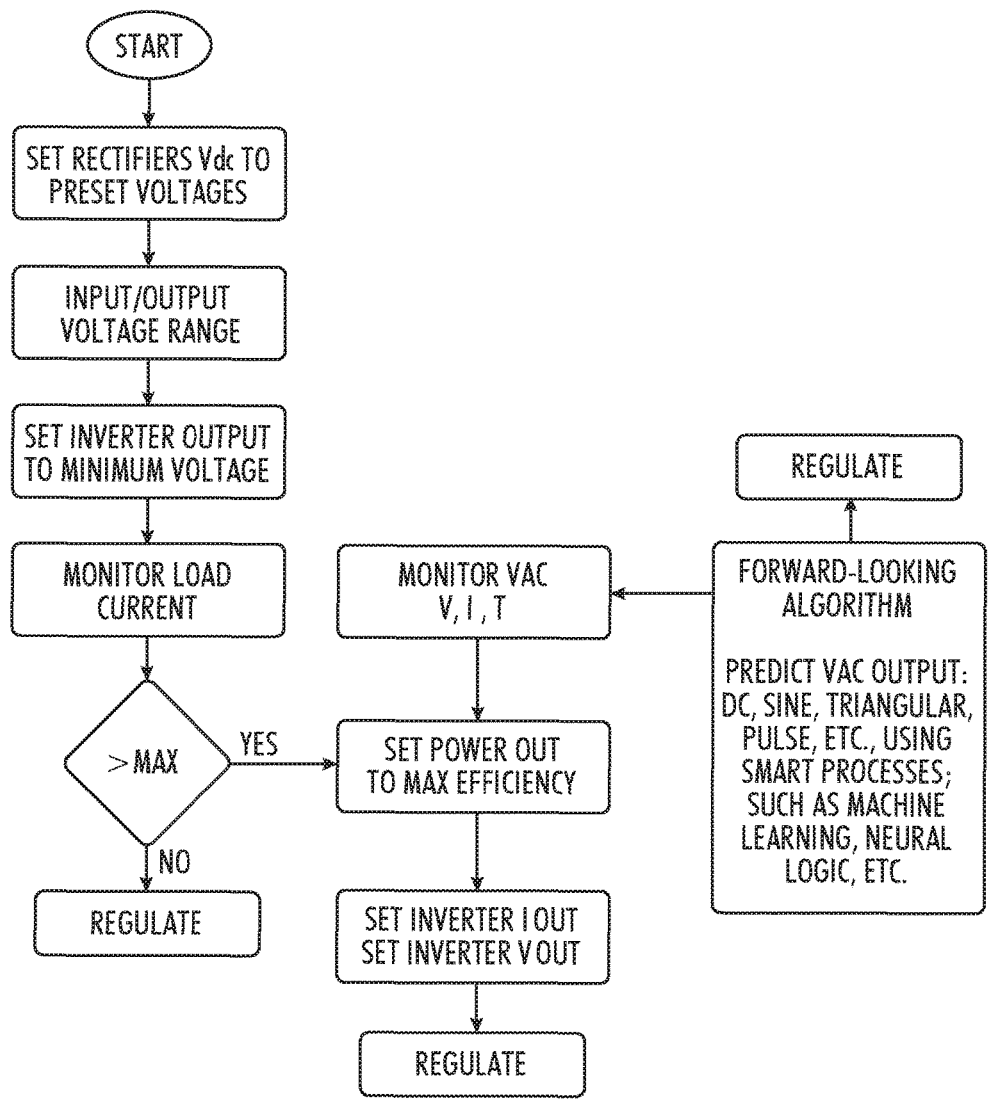
Figure 4B:
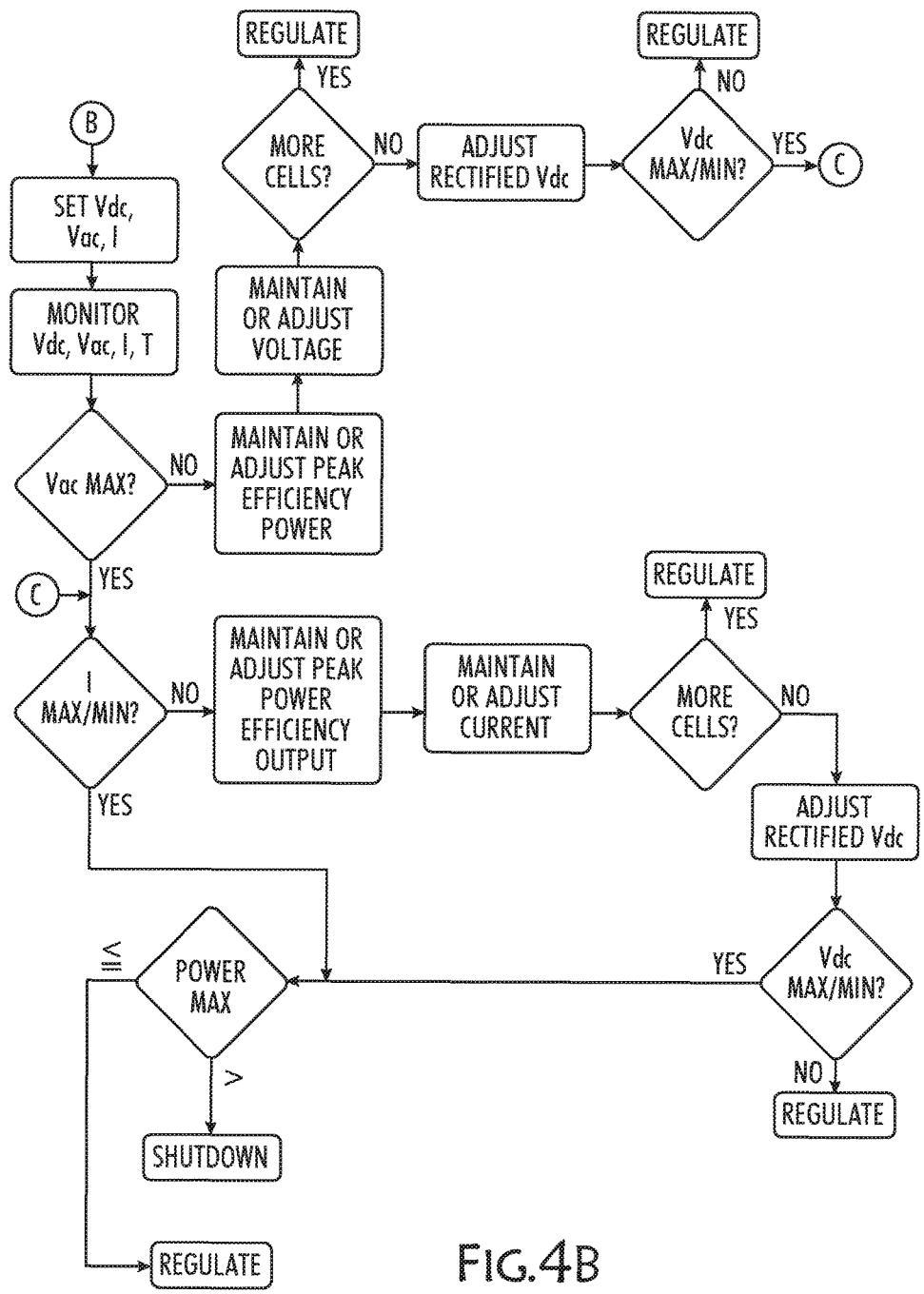
Figure 5:
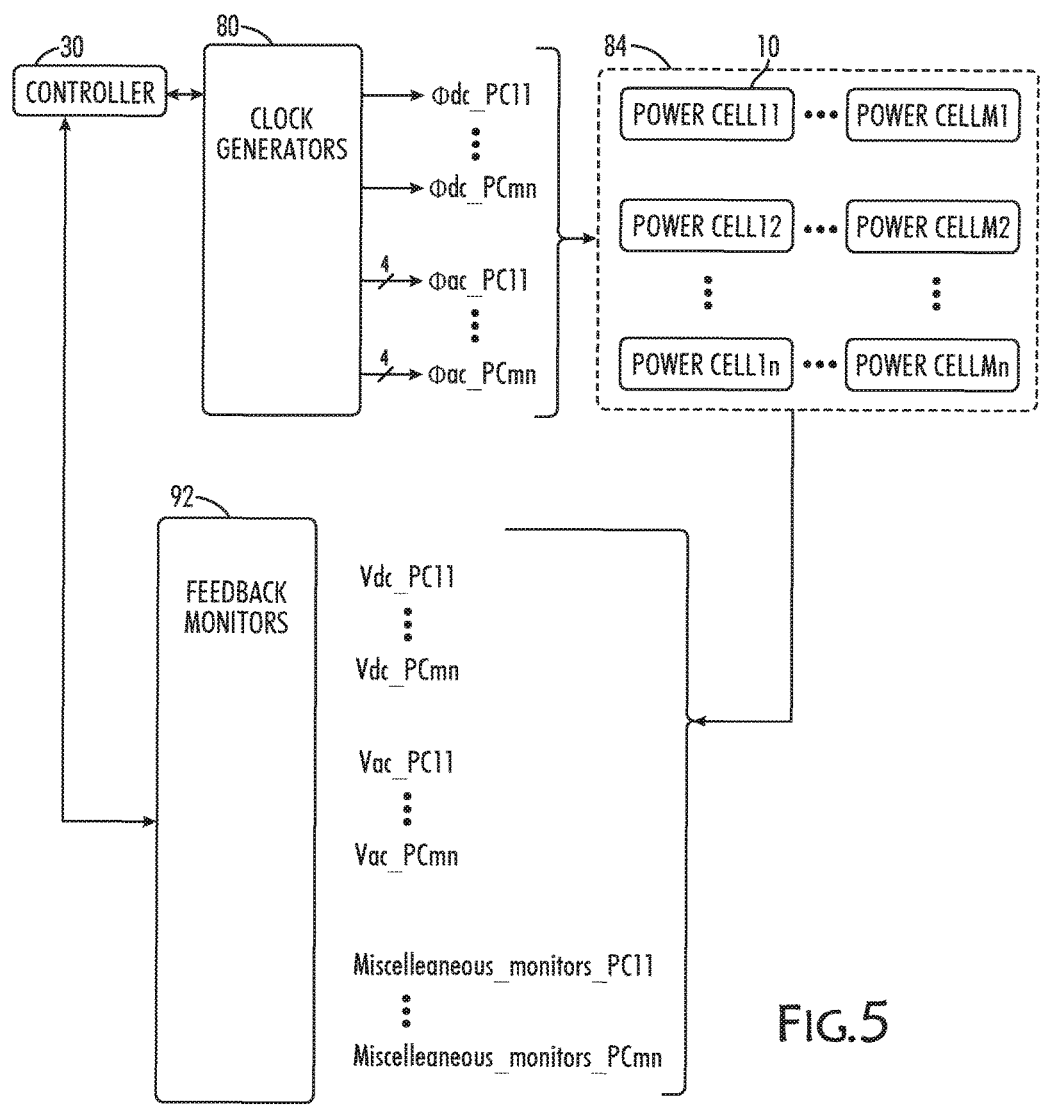
Figure 6:
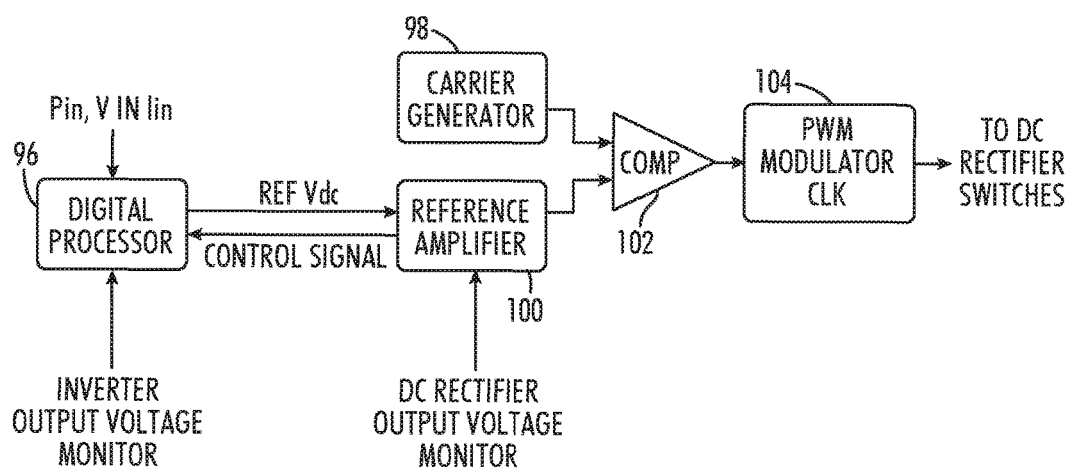
Figure 7:
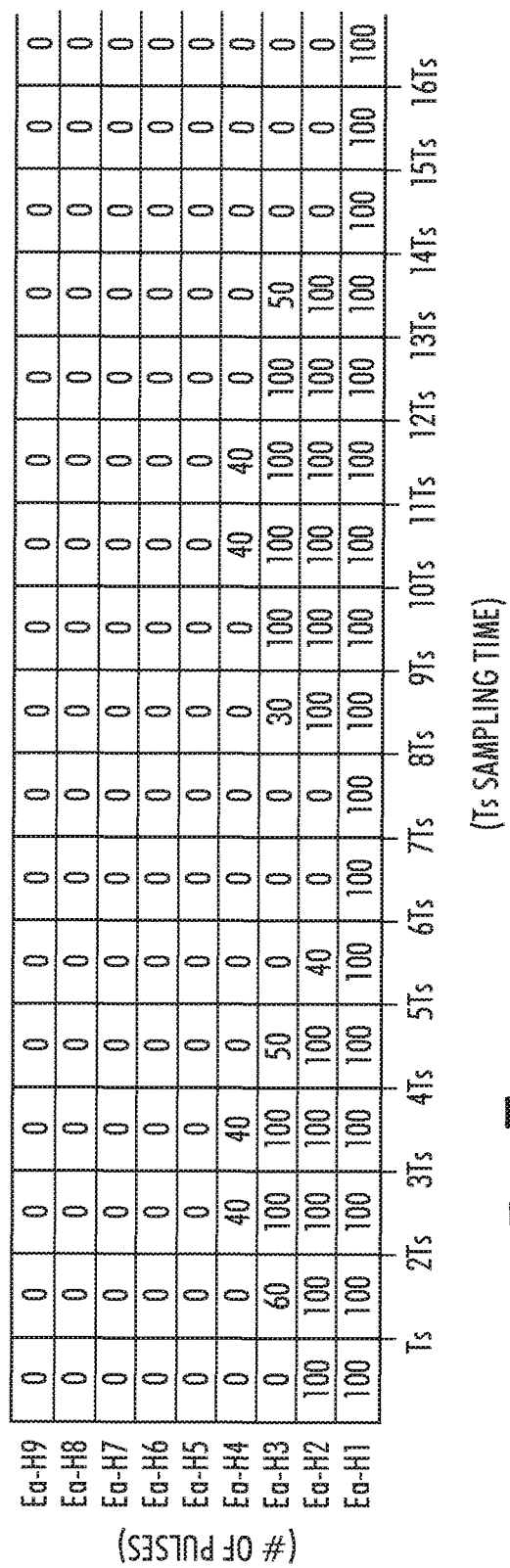
Figure 8:
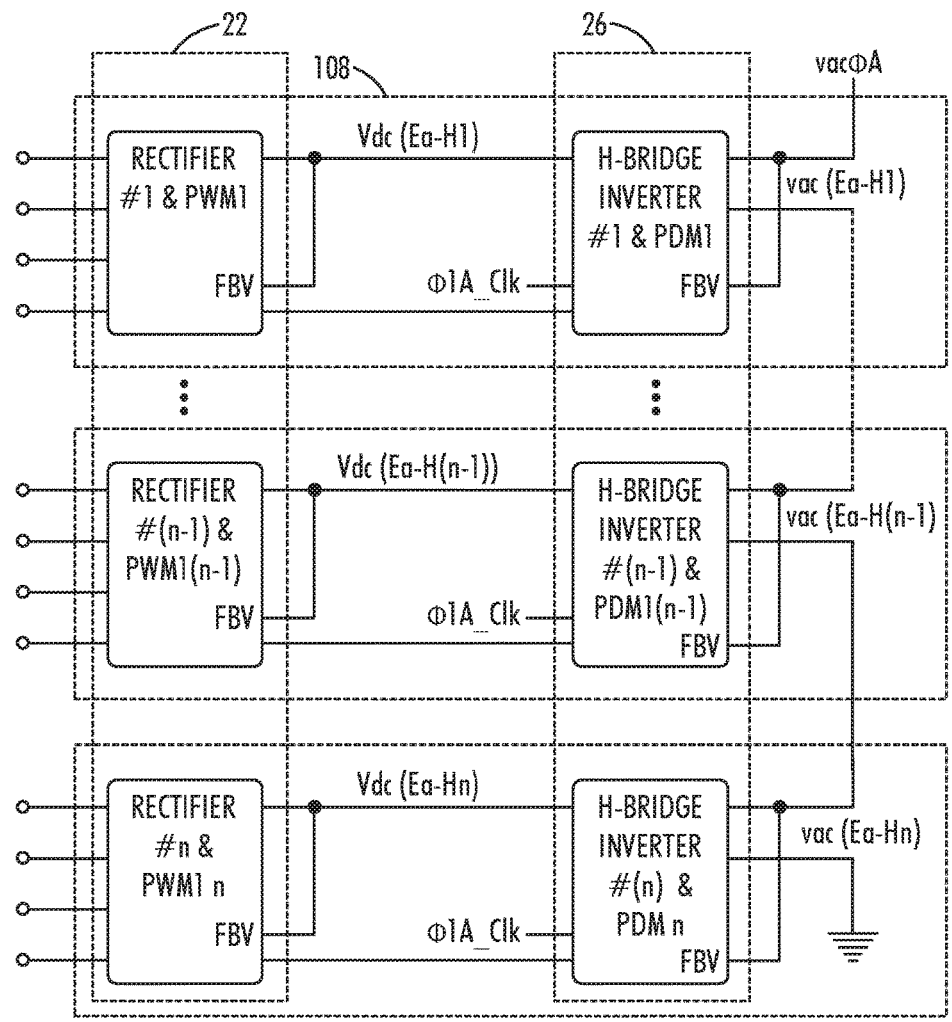
Figure 9:
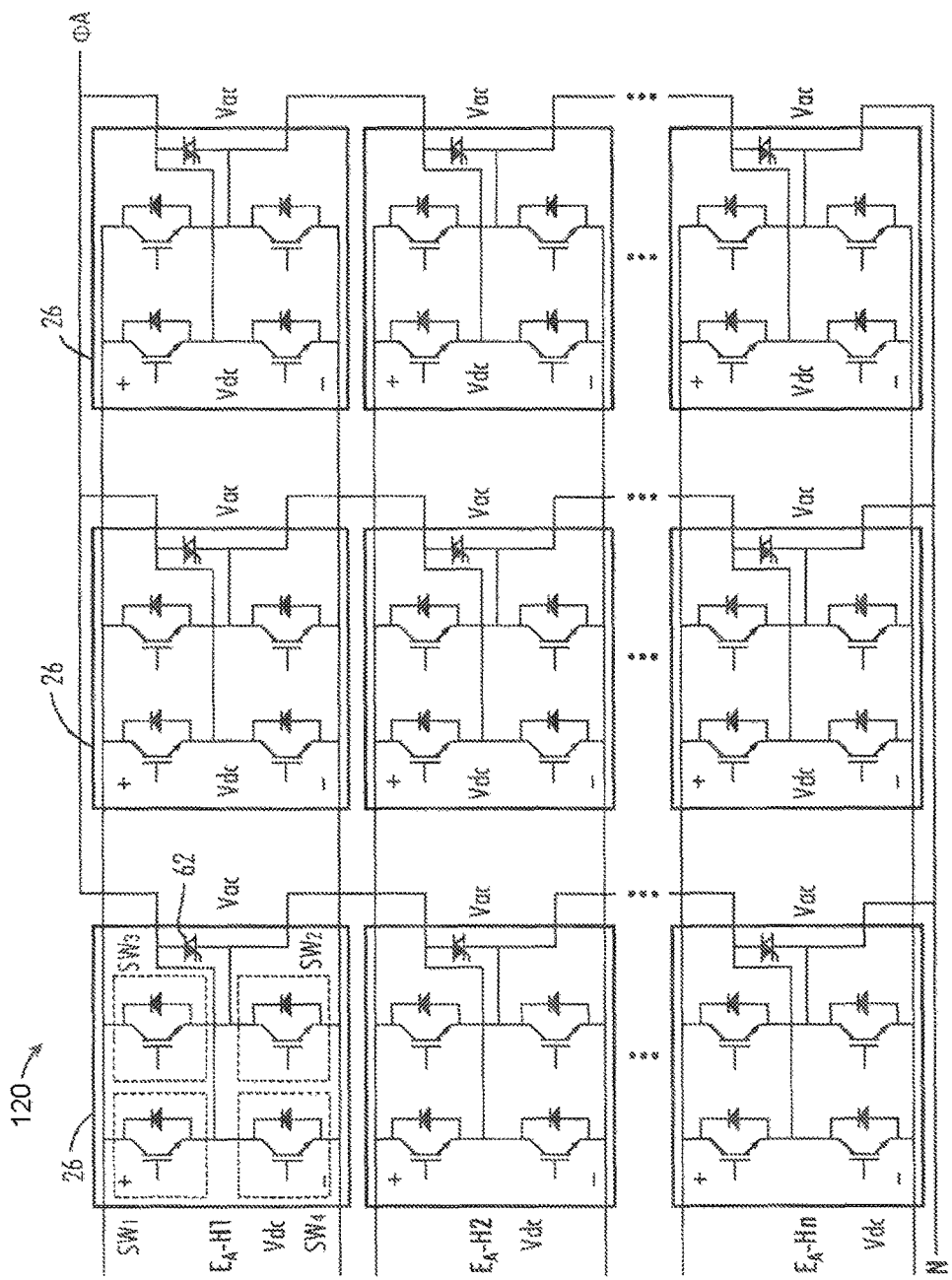
Figure 10:
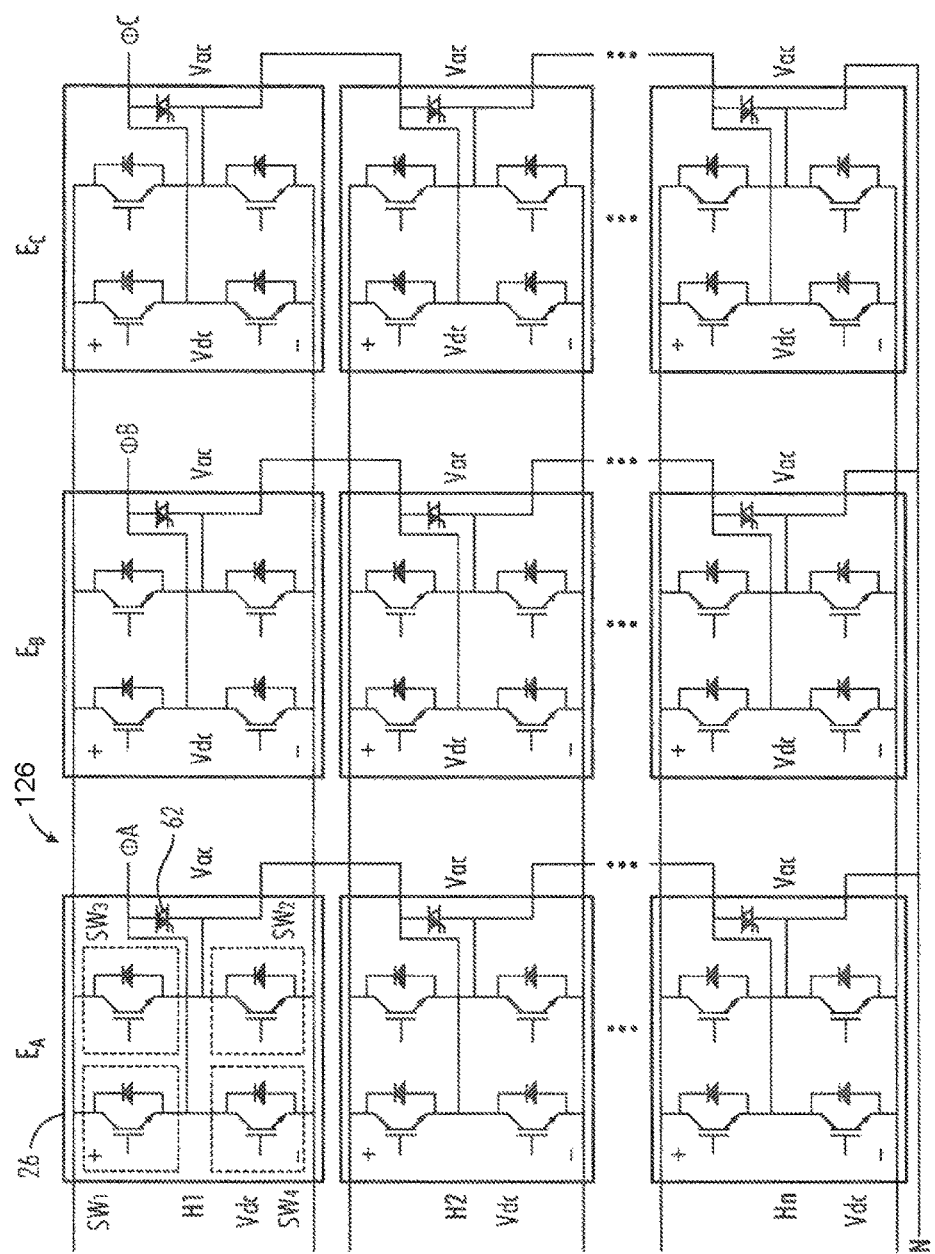
Figure 11:
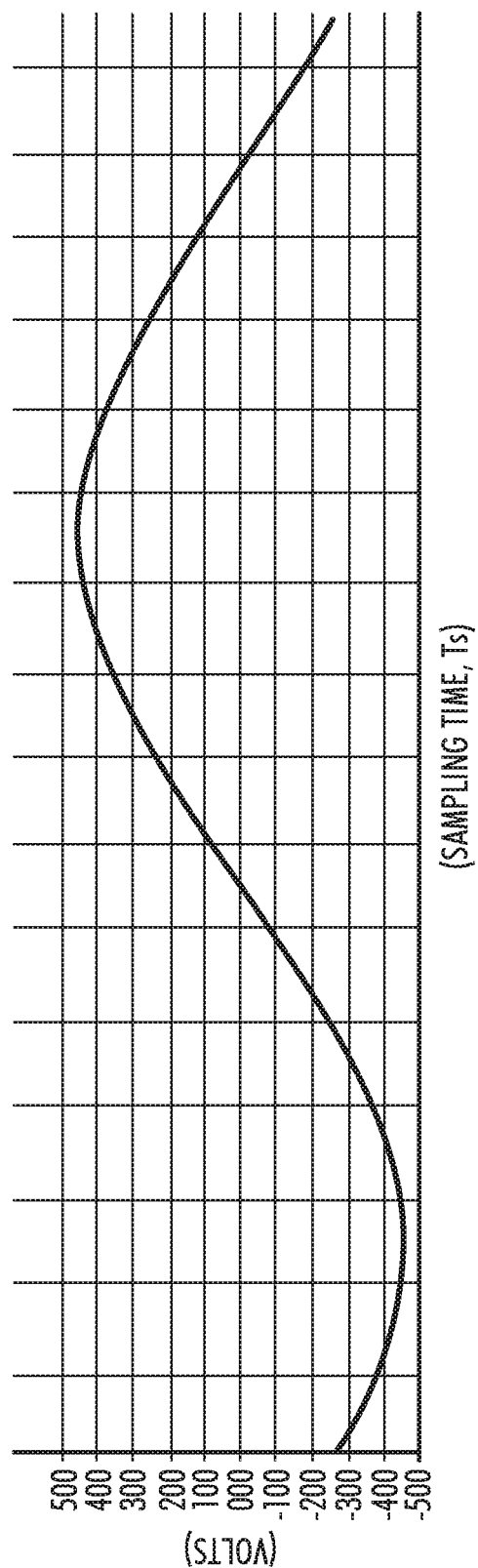
Figure 12:
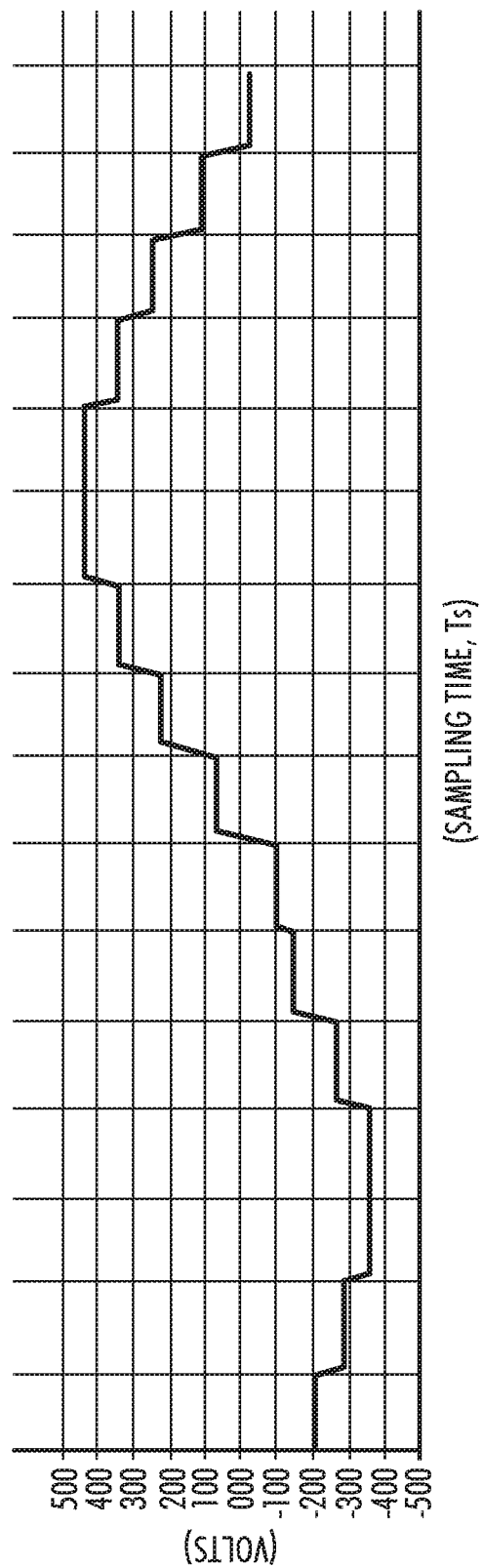

Having thus described variations of the disclosure in general terms, reference will now be made to the accompanying drawings, which are not necessarily drawn to scale, and wherein:

FIG. 1 illustrates a power cell for producing AC power from DC power, according to an aspect of the disclosure;

FIG. 2 the output of a power cell versus time, according to an aspect of the disclosure;

FIG. 3 is a set of n power cells producing three-phase AC power, according to an aspect of the disclosure;

FIGS. 4A and 4B is a flow diagram in two parts showing control of a set of n power cells, according to an aspect of the disclosure;

FIG. 5 is a schematic diagram of an n-by-m array of power cells and the controller therefor, according to an aspect of the disclosure;

FIG. 6 is a flow diagram for supplying change signals to an array of power cells, according to an aspect of the disclosure;

FIG. 7 is a chart showing an example of pulse density control, in the number of pulses in a sampling interval, over a series of intervals for nine levels of power cells, according to an aspect of the disclosure;

FIG. 8 is an illustration of n power cells for generating power for an A phase of an electric motor showing the control input to the rectifier and the inverter, according to an aspect of the disclosure;

FIG. 9 is an illustration of an array of n power cells arranged electrically in series with three power cells in parallel with each power cell of the n power cells, according to an aspect of the disclosure;

FIG. 10 is an illustration of an array of n power cells arranged electrically in series for the phases of a three-phase electric power motor, according to an aspect of the disclosure;

FIG. 11 is an example of a forward-predicted, reference power load versus time for a system of power cells, according to an aspect of the disclosure;

FIG. 12 is a graph showing an example forward-predicted AC power output as a function of time for a 5-power cells stack in meeting the predicted reference power load of FIG. 11, according to an aspect of the disclosure; and FIG. 13A-13D are four graphs, one for each of five power cells, showing their individual contribution to the total power output in meeting the demand as shown in the graph of FIG. 12.

DETAILED DESCRIPTION

Aspects of the present disclosure are directed to an efficient way to operate a system of plural power cells. A power cell comprises a rectifier and an inverter, which can be cascaded for operation using a forward looking algorithm and improved power cell management and control. The term cascaded means that additional power cells are activated to provide incremental changes in power level as demand for electric power rises and falls.

There are two basic components of the present system for delivering AC power from DC sources using 2-stage power conversion: a controller and a power cell. The power cell 10 includes a DC rectifier and an inverter drive. The shorter term, inverter, will be used herein for simplicity.

The DC rectifier sends a direct current voltage to the inverter under the control of the controller, and the inverter inverts the direct current voltage to produce an alternating current voltage as output to the load. The system may include a motor to convert the electrical power received to torque applied to a shaft. Power to the motor may come from a plurality of power cells operated by the controller as a cascaded system to supply the motor with electrical power for efficient operation as motor demand varies. The system may also include a transformer to deliver current voltages to the power cells from one or more electrical power sources.

Higher motor efficiency is obtained by maintaining motor speed steady notwithstanding changes in motor output power. Controlling the combination of voltage and current from the inverter that are output to the motor controls motor speed. Varying the rectifier's effective voltage output to the inverter by pulsing it allows the AC voltage from the inverter to the motor to meet varying motor demand while maintaining motor speed at a favorable rate for maximum efficiency of the motor. The present system is useful in systems in which typical power demand is 10% of maximum power 90% of the time and 100% power 10% of the time.

Power cells are arranged to cascade, so that a power cell 10, when activated, adds to output power incrementally. The controller controls the operation of the power cells, turning them ON or OFF or placing them in a high efficiency (HE) mode. Power cells can thus be controlled to cascade on or off as power demand changes. At 20% power output, for example, only 20% of the power cells are ON while the remainder of power cells is OFF. A power cell 10 will draw very little power (approximately 0) when turned OFF. Therefore, the output power is 20% of peak power and the efficiency of the power cells that are operating is about 90%, since those on are operating at peak power.

The basic building block of the present system is a power cell 10 comprising a DC/DC rectifier and a DC/AC inverter as seen in FIG. 1. Power cell 10 lends itself to being wired together with other identical power cells 10 in any of many possible different topologies depending on the application. A topology is an electrical wiring configuration in which power cells 10 are connected together in series, in parallel, or in a combination of series and parallel. A power cell 10 adds to the total voltage of the power cells in the series. A power cell 10 added in parallel increases the total current. The additional power cell 10 contributes to power output.

On the left side of FIG. 1, direct power is fed to a transformer 14, such as that disclosed in U.S. Pat. No. 8,559,198, noted above. A switch 18 is incorporated into a power cell 10 in order to be able to isolate power cell 10 from other power cells 10 to which it is wired in a predetermined topology. The direct current from transformer 14 passes through a rectifier 22 and is forwarded from there to an H-bridge inverter 26 having four solid state switches, SW1, SW2, SW3 and SW4. A controller 30 provides control logic signals Φ1, Φ2 Φ3, and Φ4 to solid state gates that turn ON and OFF the switches SW1, SW2, SW3 and SW4, respectively, of the H-bridge inverter 26 in accordance with the forward-looking algorithm described below. For convenience, H-bridge inverter will also be referred to herein simply as inverter.

The effective output of power cell 10 can be set between 100% ON and 100% OFF by pulse width modulation (PWM). Longer pulse duration at constant magnitude results in greater output, $V_{ac}$; likewise, shorter pulses (and longer gaps between pulses) result in reduced output. For example, suppose the direct current output of rectifier 22 is 500 $V_{dc}$, and the output of inverter drive 26 is the modified sine wave as shown in FIG. 2 The duty cycle of inverter 26 is controlled by pulsing inverter 26 on and off as controller 30 operates switches SW1-SW4 in such a way that the output of inverter 26 approximates a sign wave.

To invert the $V_{dc}$ from rectifier 22, controller 30 switches the output of rectifier 22 across H-bridge inverter 26's four switches SW1, SW2, SW3 and SW4 between ON and OFF to alternate the direction of the current thereby producing AC from DC. The voltage $V_{12}$ in FIG. 2 is the output of SWI and SW2; the voltage $V_{34}$ is the output of SW3 and SW4. Switching is timed to adjust pulse length (switching has no effect on pulse magnitude) to so that the voltage versus time plot of FIG. 2 approximates a sine wave.

An AC voltage oscillating through 500 volts stresses switches SW1, SW2, SW3 and SW4, resulting in power losses. Using a cascade of power cells 10 as if they were building blocks, each power cell 10 making a smaller incremental contribution to output, improves the efficiency of the power cell 10 used by reducing power loss.

Power loss across inverter 26's high side switches SW1 and SW3 increases as the difference between the input and output voltage increases. Therefore, reducing the difference between input and output voltage in one power cell 10, as in the foregoing example, to many power cells 10 improves efficiency. For inverters 26 operating at low power, the power losses on the low side switches SW2 and SW4 decreases as the duty cycle of the pulse width modulation (PWM) is adjusted to increase. When many power cells 10 are used, the differences between input and output voltage become smaller and the duration of the duty cycle increases. Accordingly the use of plural power cells 10 increases efficiency by reducing power loss from smaller changes in input per power cell 10 and by longer duty cycles.

In FIG. 3, in which portions of power cell 10 are simplified for convenience, multiple power cells 10 (three shown, "n" power cells 10 implied) are wired together in a multi-level, electrical series topology to achieve a higher overall efficiency than with power cell 10. FIG. 3 shows "n" power cells 10 connected to a transformer 14. DC power from at least one source is transformed by transformer 14 into individual increments of DC power, which flows to one of n rectifiers 22. Fuses 38 in the power cell 10 provide power surge protection. A rectifier input switch 46 for the rectifier 22 may be used to deactivate any power cell 10 in the event of a failure. An inverter input switch 50 may be used to short an inverter 26 in the power cell 10. A capacitor 58 delays $V_{dc}$ sent by rectifier 22 to inverter 26. A bypass switch 62 for the power cell 10, which bypass switch 62 may include a heat-sensitive thyristor, enables controller to bypass the power cell 10 in the event power cell 10 fails, such as from overheating, and may short power cell 10. The output of the stack of power cells 10 is delivered as three-phase AC to a motor 66 via a set of three inductor-capacitor circuits 70.

To respond to demand efficiently, power cells 10 are activated and deactivated; power cell 10 output may be delivered in pulses of varying width when power cells 10 are operated in HE mode, and, in variable mode, the transition from a level to the next level is smoothed. FIGS. 3, 4A, 4B, and 5 illustrate the overall components and method of controlling power cell 10 activation and deactivation of power cells 10. FIG. 6 illustrates the method of modulating the width of pulses. FIG. 7 illustrates the results of the method of using pulse density modulation in smoothing the transition.

The efficiency of multi-level topologies can be improved by incorporating peak efficiency tracking. Typical multi-level cascaded topologies have constant peak-to-peak $V_{ac}$ as the mode of operation, wherein power cells 10 are either ON or OFF, whereas, according to the present method, controller 30 varies duration of peak-to-peak voltage and current to inverters 26 to obtain peak efficiency of motor 66. In this control method, rectifier input switch 46 and inverter input switch 50 to rectifier 22 and inverter 26, respectively, (best seen in FIG. 3), are used to disable power cell 10, and capacitor 58 is used to hold the output of rectifier 22. Bypass switch 62 shorts the output of the power cell 10, and an active, forward-looking algorithm predicts the output of inverter 26. The present controller uses these tools to operate inverter 26 among four states: ON, OFF, HIGH EFFICIENCY (HE), and VARIABLE.

The control algorithm is implemented by the user in accordance with the method shown in flow diagram of FIGS. 4A and 4B, which illustrates in two parts how the present method improves efficiency using multiple power cells 10 in series-parallel topology. FIG. 5 shows the feedback configuration that is used for controlling power cells 10 in an efficient manner.

FIG. 5 illustrates how the cascaded power cells 10 are controlled. Cascaded power cells 10 are in a two-dimensional topology of n power cells 10 by M power cells 10 comprising array 84 with n power cells IOin series and m series connections of power cells 10 in parallel. Carried via the clock pulse from clock generators 88, the power cell 10 obtains voltage signals, φ1, φ2 φ3, and φ4, from controller 30 for gating the four switches SW1, SW2, SW3 and SW4 of inverters 26 (see also FIG. 3) ON and OFF, for the power cell 10 in array 84, thereby producing the $V_{ac}$ output from the $V_{dc}$ input. Feedback monitors 92 obtain $V_{dc}$ from rectifiers 42 and $V_{ac}$ from inverters 26 of the power cells 10 in array 84 plus monitored miscellaneous status information from array 84, such as the temperatures of the power cells 10. The feedback from monitoring is processed by controller 30 and used to adjust the power setup of inverters 26 for peak efficiency.

Modulation of pulse width to control peak-to-peak voltages and current helps to obtain peak power efficiency. Rectifier input switches 46 (FIG. 3) enable and disable a power cell 10; capacitors 58 hold the rectified Vdc; bypass switches 62 short the output of power cell 10; and an active, forward-looking algorithm predicts inverter output behavior.

Referring now to FIG. 6, Controller 30 includes a clock generator 98 that produces a carrier wave with a clock pulse frequency. Clock pulses, which may be triangular pulses, have a frequency at least 10 times the frequency of the sampling frequency, Ts. On receipt of a request from controller 30, a digital processor 96 in communication with controller 30 receives the target power level, output voltage and current for maximum power efficiency, and $V_{ac}$, the output voltage from inverter 26, which is being monitored by controller 30, and provides in response a reference V de as output to a forward looking, adjustable, reference amplifier 100 which serves as a peak power tracking unit. Amplifier 100 compares by comparator 102 the output voltage of rectifier 22, actual V de with the reference V de. The difference is sent as a signal on the carrier wave from carrier generator 98 to a clock 104 for modulating pulse width. Clock 104 communicates with rectifier input switch 46 of power cell 10, which turns rectifier ON or OFF to create the pulse of suitable width.

Referring again to FIG. 4A, the components of the power cells 10 in array 84 are initialized. The series/parallel topology of the power cells 10 is determined, and the voltages for switching from one power cell 10 to the next are set. Rectifiers 42 of power cells 10 are set to predetermined output of direct current voltage and the expected input and output voltages limits provided. Inverters 26 of power cell 10 are set to the minimum alternating current voltage output.

Controller 30 then begins to monitor peak voltage output of inverter 26 ($V_{ac}$), the load current (I), and the temperature (T) of power cell 10. If the values for these $V_{ac}$ and current do not correspond to those expected for the high efficiency state, either the values for $V_{ac}$ or current has dropped, and controller 30 then reconfigures rectifier 22 so Vdc, $V_{ac}$ and current result in maximum power efficiency. If the peak-to-peak voltage, load current, and temperature are within predetermined ranges, controller 30 proceeds as previously configured.

Controller 30 uses an algorithm to model the $V_{ac}$ and load current for peak power efficiency as demand varies based on a simple model. That model may be sine wave, a triangular wave, a constant voltage, or a model tuned to the particular demand as a function of time, such as one based on neural logic or machine learning. It uses this model to determine a reference Vdc, which corresponds to the $V_{dc}$ from rectifier 22 for inverter 26 to produce the $V_{ac}$ and current for maximum power efficiency. The predicted Vdc, $V_{ac}$, and current are set and monitoring continues.

Referring now to FIG. 4B, controller 30 samples actual $V_{ac}$ and current at a sampling frequency and compares them to the most efficient $V_{ac}$ predicted by the model. If the $V_{ac}$ measured is not equal to the predicted $V_{ac}$, the $V_{ac}$ can be adjusted until peak efficiency is achieved. Another power cell 10 may be activated. If there are no more power cells 10 to activate, the $V_{dc}$ of the rectifier may be adjusted upward. If the $V_{dc}$ is within its range after the adjustment, the controller next inquires about the current output by the inverter and whether it is within its range. If the $V_{dc}$ is not within range, the range may be reset.

A current that is outside its set point range may be adjusted for peak power efficiency output by increasing or decreasing the output current available by activating or deactivating power cells 10. If there are more power cells 10 in parallel with the first power cell 10, they are activated by setting the parameters of their switches. If there are no more power cells 10 to activate in parallel, the $V_{dc}$ from rectifier 26 is adjusted at the input of the H-bridge switches SW1, SW2, SW3, and SW4 added in parallel. The $V_{dc}$ is again checked to see if it is within range and, if yes, the power level is compared with the maximally efficient power level. If $V_{dc}$ is not within range, its range is reset.

If the power demand exceeds maximum power, and all power cells 10 are activated and at maximum efficiencies, the inverter is de-activated or shut down. If power is less than or equal to the maximum power level, monitoring resumes.

Motor efficiency is maintained high despite a varying demand by keeping motor speed steady and at a speed corresponding to the motor's peak efficiency, which speed is less than its maximum speed. A motor will have a curve of efficiency versus motor speed. Efficiency of a motor tends to decline rapidly as the speed drops below its maximum efficiency speed and to decline slowly as speed increases toward its maximum rated speed.

An aspect of the disclosure is a second type of modulation, namely, pulse density modulation. Pulse density modulation smooths transition from one power level to another. Pulse density modulation (PDM) is determined by the same Ref $V_{dc}$. For example, if at sampling time Ts, the Ref $V_{dc}$ is 100V, indicating that the power load was maximum, then pulse density is at an arbitrarily chosen maximum count, say, 100 pulses in the duty cycle for Ts. If Ref. $V_{dc}$ is at half power, the pulse density is halved to 50. The number of pulses is determined from the upper left side of the H-bridge inverter switch SW1 when the voltage is positive and by the upper right side of the H-bridge inverter switch SW3 when the voltage is negative. The frequency of the transitioning pulses may be very high such as 100 times the sample period, Ts, so the duration of a pulse is 1% of the duration of the sample time.

If Ref $V_{dc}$ at Ts is 40 volts, the first few of the pulses are tightly spaced to rapidly reduce the $V_{dc}$ being input to the inverter until it equals $V_{ref}$. Once equal to $V_{ref}$, the pulses are widely spaced. Controller 30 keeps the $V_{dc}$ constant until $V_{ref}$ changes to a different level. The number of pulses per Ts is determined dynamically by controller 30. FIG. 7 is a chart showing pulses counted in a sequence of sampling times from the A-phase voltage (Ea) for each of nine different power cells 10, H1-H9. Note that, in pulse density modulation and pulse width modulation, the height of the pulse remains the same, so the instantaneous torque applied by the pulse of direct current to motor 66 does not affect its speed, which remains constant at its most efficient level.

When the controller, using the forward-looking algorithm, anticipates a change in demand level and therefore a corresponding need to change the output of inverter 26 to meet that anticipated demand level efficiently, then it determines the inverter's output $V_{ac}$, the input $V_{dc}$ from rectifier 22 and the current that will produce the $V_{ac}$ for efficient operation of motor 66 at the anticipated demand. These target values are set and controller 30 resumes monitoring, and the making of subsequent adjustments based on the model with feedback from actual demand.

In the event, the $V_{ac}$ for maximum efficiency of motor 66 is not achieved despite the change in Vdc, the peak efficiency power is again adjusted or an additional power cell 10 in the series will be activated.

In the event no further power cells 10 are available, the $V_{dc}$ output of the rectifiers can be adjusted upwards by controller 30 at switches SW1, SW2, SW3, SW4, of the H-bridges of inverter 26 as long as the V de from rectifier 22 is within the maximum and minimum set points. If one of the set points has been exceeded, that set point may be reset. When another power cell 10 is available to be activated, the output $V_{ac}$ of its inverter 26 is set and controller 30 resumes monitoring $V_{ac}$, load current and temperature as before.

If the load current exceeds its upper or lower limits, the output current of inverter 26 to motor 66 is adjusted accordingly to maintain the speed of motor 66. As with $V_{ac}$, an increase in anticipated load current can be accommodated by activating a power cell 10 in parallel with the other power cells 10. A decline in load current can be accommodated by deactivating a parallel power cell 10. If there are no more power cells 10 to add in parallel, the $V_{dc}$ of rectifiers 42 can be adjusted provided the minimum and maximum set points of the inverter's H-switches SW1, SW2, SW3, and SW4 are not exceeded. If the set point limits would be exceeded, they can be reset higher.

As long as the load current is satisfactory, and the output power of inverters 26 does not exceed its maximum rating, array 84 can continue to operate.

If an increase in power demand is sensed by controller 30 at the load, then another power cell 10 may be activated. To accomplish this, controller 30 compares $V_{dc}$ and $V_{ac}$ from rectifiers 22 and inverters 26, respectively, to signaled changes in load demand. Then controller 30 estimates the peak efficiency power setup in terms of new $V_{dc}$ and $V_{ac}$ for power cells 10, and then gates the appropriate switches SW1, SW2, SW3 and SW 4 of power cells 10, accordingly. If the load is only 10%, then only 10% of power cells 10 in array 84 are activated (ON mode) while the rest remain off (SLEEP mode).

A more sophisticated approach can be used to further optimize efficiency in meeting incremental increases or decreases in demand. For instance, if demand rises and the active power cells 10 are operating at their most efficient level, it may be more efficient to have some power cells 10 operating at slightly higher output than their most efficient level, which does not degrade their efficiencies significantly, rather than activating an additional power cell 10 at very low power where its efficiency would be correspondingly very low. In addition, in some applications where the efficiency of motor 66 is operating at its most efficient speed and the load current is low, controller 30 can activate electrically parallel power cells 10 to augment the current provided by motor 66.

FIG. 8 illustrates an inverter drive comprising n power cells 10 for meeting the power demand of the A phase of motor 66 using pulse width modulation and pulse density modulation. A power cell 10 includes a diode rectifier 112 providing $V_{dc}$ that varies using pulse width modulation and an H-bridge inverter 116 smoothing transitions using pulse density modulation. The power cell 10 has four inputs, shown on the left, namely, (1) a signal to produce a three-phase Y, (2) a signal to produce a three-phase delta, (3) a clock pulse for pulse width modulation, and (4) the DC output from a transformer (not shown in FIG. 8). Inverter 116 also receives clock-pulse carried input and responds as described above with pulse density modulation. The implementation and management of modulation is managed by controller 30 (FIG. 5).

FIG. 9, shows H-bridge inverter 26 connections in array 120 of power cells 10 connected in a series/parallel configuration, with three H-bridge inverters 26 connected in parallel in the level of power cell 10 and n levels of three parallel power cells 10 wired in series. This design is modular, stacking power cells 10 for voltage and providing inverters 26 in parallel.

A row of inverters 26 is switched ON or OFF depending on the load. An inverter 26 has four gated switches: SW1 is at the top left; SW2, at bottom right; SW3, top right; and SW4, bottom left.

A voltage applied to a gate opens one the corresponding switches SW1, SW2, SW3, and SW4. The voltages applied to the gates on the left side switches SW1, SW4, of inverter 26 are 180 degrees out of phase of the voltages applied to the gates of switches SW3, SW2, on the right side of the inverter 26. The voltage to the first gate in inverter 26 in the first level, H1, is denoted vg11. The other three voltages for the gates in that inverter 26 are denoted vg21, vg31, and vg41. The voltage for the first gate in the three inverters 26 in the second level, H2, are vg12, vg22, vg32, and vg42, and the voltage for the gate in the three inverters 26 in the nth level, it is vg1n, vg2n, vg3n and vg4n. A column of inverters 26 is turned ON in left to right sequence for more current and OFF in right to left sequence for less current.

If a column of cascaded power cells 10 fails SHORT, then bypass switches 62 of the power cells 10 in the first column with the failed power cell 10 can be reset to OPEN-Circuit so that the remainder of inverters 26 in the column remain operational.

If a power cell 10 of an array 120 fails OPEN, then H-switches SW1, SW2, SW3, and SW4 can be reset so as to short the output of power cell 10 so that the remaining power cells 10 in that series remains operational. Alternatively, bypass switch 62 may be activated.

FIG. 10 illustrates an array 126 of n inverters 26 in series for a phase A, B, or C. The inverters 26 for a phase will generate $V_{ac}$ for the phase, to be applied to the appropriate phase of motor 66.

Assume that one power cell 10 for an inverter 26 that is capable of ±500V, 100 A as shown in FIG. 2 is replaced by n power cells 10. The number n could be five power cells 10 capable of ±100 Volts at 100 A, (or it could be 10 power cells 10 operating at ±50V at 50 A with five power cells 10 in each of two series that are arranged in parallel). By using a cascade of power cells 10, we reduce switching stress, a function of dV/dt, across switches SW1, SW2, SW3, SW4, and, if the modulation of the pulse is set to produce peak power efficiency (a function of motor speed), then a minimum of these power cells 10 will be in the active (i.e., ON) mode, while the rest are in a sleep (i.e., OFF) mode. The pulse duration of a power cell 10 is maximized to reduce power loss. In addition, if pulse density modulation is used to smooth the transition from level to level, further efficiencies from reduced power loss are obtained. The active power cells 10 deliver a $V_{ac}$ to a motor 66 that runs at a steady speed as power cells 10 vary $V_{ac}$ and current for power efficiency.

If the reference voltage using the forward-looking algorithm may be represented as depicted in FIG. 11, namely, by a sine wave oscillating between plus and minus 500 V, and if the sampling frequency is set at 500 Hz×17, or 8500 Hz, then the power output can be divided among five power cells 10, each power cell 10 having 100V output.

At a sampling interval, which is 1/8500 Hz, or 11.8 ms, the $V_{ref}$ sine wave is sampled; the sampled voltage level represents the output voltage levels to be achieved by the 10 power cells 10. The $V_{ac}$ levels are marked + for inputs greater than zero and − for inputs below zero. At frequent sampling intervals, the output level of a power cell 10 is analyzed to determine if it needs to be switched ON or OFF. $V_{ac}$ for power cell 10 that represents the lowest voltage level, namely, the Ea-H1-bridge inverter 26, is ON from Ts index=1 to Ts index=15, so its output remains at full power from Ts index=1 to Ts index=15, as shown in FIG. 13A. At Ts index=16, it reduces $V_{ac}$ to 20% and at Ts index=7 and 8, to zero. Ea-H2-bridge inverter 26 is on until Ts index=5, as seen in FIG. 13B, then drops to 40% power, and then to zero at Ts index-6. At Ts=index 9, it rises back to 80%, and then to 100% at the next index, Ts=index 10, where it remains until Ts index=14 whereupon it drops again. FIGS. 13C and 13D illustrate the output of Ea-H3 and Ea-H4 so that their respective contributions to total $V_{ac}$ are as shown in FIG. 12. Note that the transitions from one power level to another are modulated using pulse density modulation to smooth the transitions.

The controller 30 obtains output signal information to complete the control loop. The signals it monitors include at least AC output voltage, load current, and temperature.

The topology is scaled at real-time in terms of voltage and current load demands. Power cells 10 are activated or deactivated in series to change Vac, and in parallel to change current. Various series, parallel and series/parallel topologies of power cells 10 are possible. In addition, demand is matched by adjusting either the current or the voltage or both of inverter 26 to produce the combination that is most efficient.

Power cell 10 performance issues can also be solved more readily in mixed series/parallel configurations. These issues include voltage unbalance, current unbalance, and power factor. Voltage and current unbalance occur when there is a difference in the values of voltage and current among the three phases of a system, respectively. Rectified voltage from rectifiers 22 to inverters 26 is delivered to each of the three phases equally so that voltage imbalances among the three phases are avoided.

Power factor (PF) is normally particular to the motor used and heavy accessories, such as transformers. PF is the ratio of real (working) power to apparent total power and it is a combination of real power and reactive power. PF is given as a percentage or a number less than or equal to 1. A power factor of 1 is ideal.

A problem with any of these foregoing variables may be immediately corrected using software to sense the problem and respond and to make adjustments in topology in the short run.

The disclosure describes increased DC-to-AC power conversion efficiency in a scalable, flexible, resilient cascading inverter drive topology using a forward-looking controller to set rectifier output voltage, modulating it in pulses of varying width to vary power output while maintaining pulse height constant so that motor speed is held constant for efficiency, and using pulse density modulation to smooth transitions from one power level to the other.

When introducing elements of the present disclosure or exemplary aspects thereof, the articles "a," "an," "the" and "said" are intended to mean that there are one or more of the elements. The terms "comprising," "including" and "having" are intended to be inclusive and mean that there may be elements in addition to the listed elements. Although this disclosure has been described with respect to specific aspects, the details of these aspects are not to be construed as limitations.

What is claimed is:

1. An electric power inverter system, comprising:
   a controller; and
   a plurality of power cells, each including
   a rectifier configured to receive electricity and output a direct current (DC) voltage, and
   an inverter comprising four switches in an H-bridge configuration, said inverter receiving said direct current voltage from said rectifier and generating an alternating current (AC) voltage, and wherein said controller enables said power cell to operate in an ON state wherein said alternating current voltage of said power cell is maximum, an OFF state wherein said alternating current voltage of said power cell is zero, and a high efficiency state wherein said alternating current voltage is between said ON state and said OFF state;
   wherein said controller is configured to monitor a load, and in response to changes in the load, to control each power cell's state so as to effectively operate with more or fewer power cells enabled.

2. The electric power inverter system of claim 1, wherein, when said output of said power cell varies between said power level of said ON state and power level of said OFF state, said controller determines the rate at which said output of said power cell varies.

3. The electric power inverter system of claim 1 wherein the controller operates the electric power inverter system at high efficiency by, for each required output voltage, operating a subset of the power cells in the ON state, optionally operating one power cell in the high efficiency state, and operating the remaining power cells in the OFF state.

4. The electric power inverter system of claim 1 wherein, for each power cell, the controller controls the DC output of the rectifier by pulse width modulation, which determines the AC output voltage of the inverter.

5. The electric power inverter system of claim 1 wherein, for each power cell, the controller controls the AC output of the inverter by pulse density modulation, which smooths transitions between discrete voltage output values.

6. An electric power inverter system, comprising:
   a controller;
   an electric motor; and
   a plurality of power cells controlled by said controller and providing power to said electric motor, each power cell of said plurality of power cells including
   a rectifier configured to rectify electricity and output a direct current (DC) voltage, and
   an inverter comprising four switches in an H-bridge configuration, said inverter receiving said direct current voltage from said rectifier and producing as output an alternating current (AC) voltage to said electric motor, and wherein a power cell of said plurality of power cells has at least three states, including an ON state wherein said alternating current voltage of said power cell is maximized, and an OFF state wherein said alternating current voltage of said power cell is zero, and a high efficiency state wherein said alternating current voltage is between said ON state and said OFF state;

wherein said controller is configured to control a speed of the electric motor by controlling each power cell's state so as to effectively operate with more or fewer power cells enabled, thus controlling the voltage and current output by the power cells to the electric motor.

7. The electrical power inverter system of claim 6, wherein said motor has a peak efficiency dependinq on its speed, and wherein said controller operates said motor at said speed.

8. The electric power inverter system of claim 6, wherein said power cell has a variable state, and wherein said alternating current voltage of said power cell transitions between said output of said power cell in said ON state and said output of said power cell in OFF state.

9. The electric power inverter system of claim 8, wherein said power cell transitions in pulses when in said variable state.

10. The electric power inverter system of claim 9, wherein said controller provides a number of said pulses and wherein said number of said pulses is related to the magnitude of a transition in voltage between said ON state and said OFF state.

11. The electric power inverter system of claim 9, wherein said pulses have a pulse density and wherein said pulse density varies to control the speed of the transition between ON and OFF.

12. The electric power inverter system of claim 11, wherein said direct current voltage from said rectifier is pulsed.

13. The electric power inverter system of claim 12, wherein said controller is configured to set the duration of said pulses.

14. The electric power inverter system of claim 12, wherein said pulses vary in duration and have constant magnitude.

15. The electric power inverter system of claim 6, wherein said plural power cells are arranged in series.

16. The electric power inverter system of claim 6, wherein said plural power cells are arranged in parallel.

17. The electric power inverter system of claim 6, wherein said plural power cells are arranged in a topology including power cells in series and series-connected strings of power cells in parallel.

18. The electric power inverter system of claim 6, wherein said power cell includes a bypass switch responsive to said controller, and wherein said controller bypasses said power cell using said bypass switch in the event said power cell fails.

19. The electric power inverter system of claim 18, wherein said bypass switch is temperature sensitive and operates to bypass said power cell if said power cell overheats.

20. The electric power inverter system of claim 6, wherein said output of said power cell is added to power outputs of other power cells of said plurality of power cells in a cascade.

21. The electric power inverter system of claim 6, wherein said power cell further comprises a fuse.

22. The electric power inverter system of claim 6, further comprising an input switch for said inverter to isolate said inverter in said power cell.

23. The electric power inverter system of claim 6, further comprising a capacitor between said rectifier and said inverter.

24. The electric power inverter system of claim 6, wherein said controller is configured to monitor peak voltage, load current, power, and temperature by sampling at a sampling frequency.

25. The electric power inverter system of claim 6 wherein the controller operates the electric power inverter system at high efficiency by, for each required output voltage, operating a subset of the power cells in the ON state, optionally operating one power cell in the high efficiency state, and operating the remaining power cells in the OFF state.

26. The electric power inverter system of claim 6 wherein, for each power cell, the controller controls the DC output of the rectifier by pulse width modulation, which determines the AC output voltage of the inverter.

27. The electric power inverter system of claim 6 wherein, for each power cell, the controller controls the AC output of the inverter by pulse density modulation, which smooths transitions between discrete voltage output values.

28. The electric power inverter system of claim 6 wherein the controller sets the input and output voltages of each power cell so as to generate a desired AC output voltage level, with a predetermined difference in input and output voltage for each power cell determined to maximize efficiency of the power cells.

* * * * *